United States Patent [19]

Hyuga et al.

[11] Patent Number: 4,752,594
[45] Date of Patent: Jun. 21, 1988

[54] DIELECTRIC CERAMIC

[75] Inventors: Takehiro Hyuga, Ichikawa; Kazutoshi Matsumoto, Matsudo, both of Japan

[73] Assignee: Sumitomo Metal Mining Company Limited, Tokyo, Japan

[21] Appl. No.: 920,220

[22] Filed: Oct. 17, 1986

[30] Foreign Application Priority Data

Oct. 18, 1985 [JP] Japan ............... 60-232594
May 9, 1986 [JP] Japan ............... 61-106155

[51] Int. Cl.$^4$ ............................ C04B 35/46
[52] U.S. Cl. ........................ 501/135; 501/134
[58] Field of Search ............ 501/135 (US only), 134

[56] References Cited

U.S. PATENT DOCUMENTS

| | | | |
|---|---|---|---|
| 2,805,165 | 9/1957 | Goodman | 501/135 |
| 2,961,327 | 10/1958 | Goodman | 501/135 |
| 4,121,941 | 10/1978 | Kanashima et al. | 501/135 |
| 4,265,668 | 5/1981 | Fujiwara et al. | 501/134 |
| 4,485,180 | 11/1984 | Konoike et al. | 423/266 |
| 4,487,842 | 12/1984 | Nomura et al. | 501/135 |
| 4,637,989 | 1/1987 | Ling et al. | 501/134 |

FOREIGN PATENT DOCUMENTS

| | | | |
|---|---|---|---|
| 53-60540 | 5/1978 | Japan | 501/135 |
| 55-32723 | 3/1980 | Japan | 501/135 |
| 55-68004 | 5/1980 | Japan | 501/135 |
| 61-78007 | 4/1986 | Japan | 501/135 |
| 61-142602 | 6/1986 | Japan | 501/135 |
| 56-96769 | 8/1987 | Japan | 501/135 |

OTHER PUBLICATIONS

*Chemical Abstracts:* vol. 83, "Transparent Perovskite-Type Ceramics", No. 64884n; vol. 91, Electric Insulator Ceramic, No. 116272y; vol. 100, Valency-Compensating Perovskites, No. 78479r; vol. 105, Readily Sinterable Fine Complex Lead Oxide as Electro-Ceramics Precursor, No. 213263m; vol. 105, Readily Sinterable Fine Complex Lead Oxide as Electroceramics Precursor, No. 213264; vol. 105, Mixed Oxide Powder Containing Lead as Electroceramic Precursor, No. 196189x; vol. 105, Readily Sinterable Fine Complex Oxide as an Electroceramics Precursor, No. 231409t; vol. 105, Successive Wet Production of Readily Sinterable Perovskite and its Solid Solutions as Powder, No. 47814v; vol. 105, Wet Production of Readily Sinterable Perovskite and its Solid Solutions as Powder, No. 47815w; vol. 105, Wet Production of Readily Sinterable Perovskite and its Solid Solutions as Powder, No. 47816x; vol. 106, Fine Perovskite Type Complex Oxides as Readily Sinterable Electroceramic Precursors, No. 106891p; vol. 106, Ceramic Compositions having Non-Linear Dependence on Voltage, No. 142868v.

*Primary Examiner*—William R. Dixon, Jr.
*Assistant Examiner*—Andrew B. Griffis
*Attorney, Agent, or Firm*—Watson Cole Grindle & Watson

[57] ABSTRACT

A dielectric ceramics comprises a complex oxide having a perovskite-type crystal structure, the complex oxide substantially having the composition represented by the following general formula (I)

$$(Ba_{(1-x)}Sr_x)\{(Mg_{(1-y)}Zn_y)_{\frac{1}{3}}( -Ta_{(1-z)}Nb_z)_{2/3}\}O_3 \quad (I)$$

wherein x, y and z are numbers represented respectively by the expressions $0 < x < 1$, $0 < y < 1$, and $0 < x < 1$. The temperature coefficient of the resonant frequency of the ceramics can be freely changed by adjusting the x value.

1 Claim, 2 Drawing Sheets

DIELECTRIC CERAMIC

BACKGROUND OF THE INVENTION

1. Field of the Invention

This invention relates to novel dielectric ceramics, and more specifically, to dielectric ceramics which permits free control of the temperature coefficient of the resonant frequency to a positive or a negative value, and is suitable for use in constructing high frequency oscillators and filters.

2. Description of the Prior Art:

High frequency dielectric ceramics used as resonators or the like are generally required to have a high specific dielectric constant, a high unloaded Q and a low absolute value of the temperature coefficient of the resonant frequency. In recent years, complex oxides having a perovskite-type crystal structure having the composition represented by $A(B'_{\frac{1}{3}}B''_{\frac{2}{3}})O_3$ wherein A and B' represent a divalent cation, and B'' represents a pentavalent cation have attracted attention as high frequency dielectric ceramics, and for example, $Ba(Zn_{\frac{1}{3}}Ta_{\frac{2}{3}})O_3$ and $Ba(Mg_{\frac{1}{3}}Ta_{\frac{2}{3}})O_3$ are known.

High frequency dielectric ceramics are also used as resonators in oscillators for high frequencies such as microwaves and millimeter waves. When such an oscillator is used, for example, in satellite broadcasting, it is desired to increase its temperature stability by minimizing the absolute value of the temperature coefficient of the oscillating frequency, i.e. to a value within ±1.8 ppm/° C. (the oscillating frequency 10.678 GHz±1.5 MHz, −30 to +50° C.). The temperature coefficient of the oscillating frequency is determined not only by the temperature coefficient ($\tau_f$) of the resonant frequency of the dielectric ceramics, but also by various factors such as the temperature coefficient of FET, the coefficient of thermal expansion of the substrate or the coefficient of thermal expansion of the metallic casing. No technique, however, has been established by which the oscillator is designed with all these factors taken into consideration and the temperature coefficient of the oscillating frequency is accurately controlled. The best method presently practiced is to select dielectric ceramics having a suitable temperature coefficient of the resonant frequency and incorporate it in an oscillator whereby the temperature coefficients, etc. of other component parts are compensated and consequently, the temperature coefficient of the oscillating frequency of the oscillator is controlled. It is desired therefore not only to minimize the absolute value of the temperature coefficient of the resonant frequency of high frequency dielectric ceramics, but also to control the temperature coefficient freely to a desired positive or negative value in the production of the dielectric ceramics.

The aforesaid conventional high frequency dielectric ceramics, however, have the disadvantage that particularly, in the microwave and millimeter wave regions, the temperature coefficient of the resonant frequency can assume only a nearly constant value for a given material of which the dielectric ceramics is made, and its value cannot be controlled freely to a desired positive or negative value in the production of the ceramics.

SUMMARY OF THE INVENTION

It is an object of this invention to provide dielectric ceramics in which the temperature coefficient of the resonant frequency can be freely controlled to a positive or negative desired value from zero in its production.

According to this invention, the above object is achieved by a dielectric ceramics comprising complex oxide having a perovskite-type crystal structure, said complex oxide substantially having the composition represented by the following general formula (I)

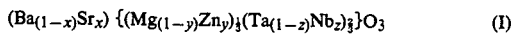

$$(Ba_{(1-x)}Sr_x)\{(Mg_{(1-y)}Zn_y)_{\frac{1}{3}}(Ta_{(1-z)}Nb_z)_{\frac{2}{3}}\}O_3 \qquad (I)$$

wherein x, y and z are numbers represented respectively by the expressions $0<x<1, 0<y<1$, and $0<z<1$.

DETAILED DESCRIPTION OF THE INVENTION

Figure 1:
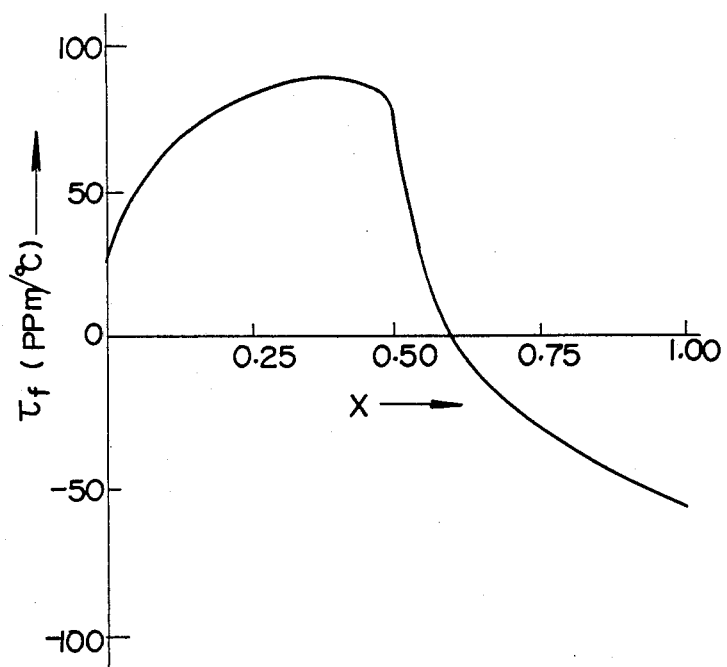
FIG. 1 is a graph showing changes in temperature coefficient ($\tau_f$) of the resonant frequency with respect to x which represents the proportion of Ba and Sr in the dielectric ceramics of this invention.

In the present specification and the appended claims, the "complex oxide having a provskite-type crystal structure" (to be referred to simply as "provskite-type complex oxide") denotes a complex oxide represented by the general formula $A(B'_{\frac{1}{3}}B''_{\frac{2}{3}})O_3$ wherein A and B' represent a divalent cation, and B'' represents a pentavalent cation; hereinafter, B' and B'' are generically referred to as B-site ions.

In the dielectric ceramics represented by general formula (I) of this invention, the A-site ion is composed of barium (Ba) and strontium (Sr), and the B-site ions are composed of magnesium (Mg), zinc (Zn), tantalum (Ta) and niobium (Nb).

The temperature coefficient ($\tau_f$) of the resonant frequency of the dielectric ceramic provided by this invention is determined mainly by the x value which represents the proportion of the A-site ions, and varies slightly depending upon the y and z values showing the proportions of the B-site ion. When x is about 0.6, the temperature coefficient becomes zero. By adjusting x to below 0.6, the temperature coefficient shows a positive value, and when x exceeds 0.6, it shows a negative value. Since the temperature coefficient changes continuously from a positive to a negative value with increasing x, the temperature coefficient can be freely controlled to a desired positive or negative value by adjusting the x value. The x value slightly affects the unloaded Q ($Q_o$) of the dielectric ceramics, but hardly affects its specific dielectric constant ($\epsilon_r$).

The y value representing the proportion of Mg and Zn and the z value representing the proportion of Ta and Nb affect the specific dielectric constant $\epsilon_r$ and $Q_o$ of the dielectric ceramics, but do not substantially affect the temperature coefficient.

The dielectric characteristics of the dielectric ceramic of this invention can be controlled by adjusting the x, y and z values which represent the proportions of the A-site ions and B-site ions. In other words, the temperature coefficient can be controlled, as is desired, to zero or a positive or negative value by changing the x value. The specific dielectric constant of the ceramics can be controlled by changing the y and z values, and the unloaded Q ($Q_o$) of the ceramics can be controlled by changing the x, y and z values.

The specific dielectric constant of the dielectric ceramics of this invention is generally as high as at least about 25. By increasing y and z, higher specific dielectric constants can be obtained, and it is even possible to obtain a specific dielectric constant of about 40. The $Q_o$ is generally large, for example, by selecting the ceramics composition in accordance with the data shown in Examples given hereinbelow, the unloaded Q can be adjusted. It is even possible to obtain dielectric ceramics having a $Q_o$ of at least 18,000.

It is critical that the dielectric ceramics of this invention should have a (Ba, Sr):(Mg, Zn):(Ta, Nb) atomic ratio of substantially 3:1:2, and its crystal structure is substantially of the perovskite type. X-ray diffraction permits determination of the dielectric ceramics of this invention to have a substantially perovskite-type crystal structure. In the process of producing the ceramics, the above atomic ratio may sometimes deviate slightly from 3:1:2 when strictly determined, because of, for example, errors in weighing, evaporation of the components during firing, etc. So long as the crystal structure of the ceramics is maintained substantially of the perovskite type, ceramics having such a slight deviation in atomic ratio is regarded as substantially having an atomic ratio of 3:1:2.

The expression "substantially of the perovskite type" means that in X-ray diffraction of the ceramics, a phase having a perovskite-type crystal structure is observed, but the other phases are not at all, or scarcely, observed.

The dielectric ceramics of this invention can be produced in a customary manner. For example, barium carbonate, strontium carbonate, magnesium oxide, zinc oxide, tantalum oxide and niobium oxide in powder form as material for Ba, Sr, Mg, Zn, Ta and Nb components are weighed in such proportions as to give the desired ceramics composition, and thoroughly mixed. The mixture is calcined to convert all components to oxides, and compression-molded. The molded article is then fired at a temperature of about 1500° to 1650° C.

The following Examples illustrate the invention more specifically.

EXAMPLE 1

Powders of barium carbonate, strontium carbonate, magnesium oxide, zinc oxide, tantalum oxide and niobium oxide all having a purity of 99.9% by weight were used as raw materials. In each run, these raw material powders were weighed so as to give ceramics having each of the compositions shown by x, y and z of general formula (I) in Table 1, and put in a polyethylene pot together with pure water. They were wet-mixed for 16 hours using balls having resincoated surfaces. The resulting mixture was taken out of the pot, dried at 150° C. for 5 hours and then calcined in air at 1000° C. for 2 hours. After the calcination, the mixture was pulverized in an alumina mortar, and passed through a 42-mesh sieve to make the particle size uniform. The resulting powder was molded primarily into a disc having a diameter of 10 mm and a thickness of about 5 mm under a pressure of 500 kg/cm², and then compressed by applying a hydrostatic pressure of 2000 kg/cm². The molded article was fired at 1650° C. for 4 hours in an oxygen stream to form ceramics of this invention.

The $\epsilon_r$, $Q_o$ and $\tau_f$ of the resulting ceramics were measured by a dielectric rod resonator method at a frequency of about 10 GHz. The results of the measurement are shown in Table 1.

It is seen from Table 1 that $\tau_f$, which is the temperature coefficient of the resonant frequency, becomes zero when the x value representing the proportion of Ba and Sr is about 0.6 and becomes negative with increasing x and positive with decreasing x. If the x value is constant, the $\tau_f$ remains nearly constant even when the y value representing the proportion of Mg and Zn and the z value representing the proportion of Ta and Nb are varied arbitrarily. This shows that $\tau_f$ depends only upon the x value.

FIG. 1 is a graph showing changes of $\tau_f$ with respect to the x value where x=1−y=1-z. FIG. 1 shows that wit increasing z, $\tau_f$ continuously changes from a positive to a negative value. It can be easily determined from FIG. 1 at what value x should be set to obtain the desired $\tau_f$.

Figure 2:
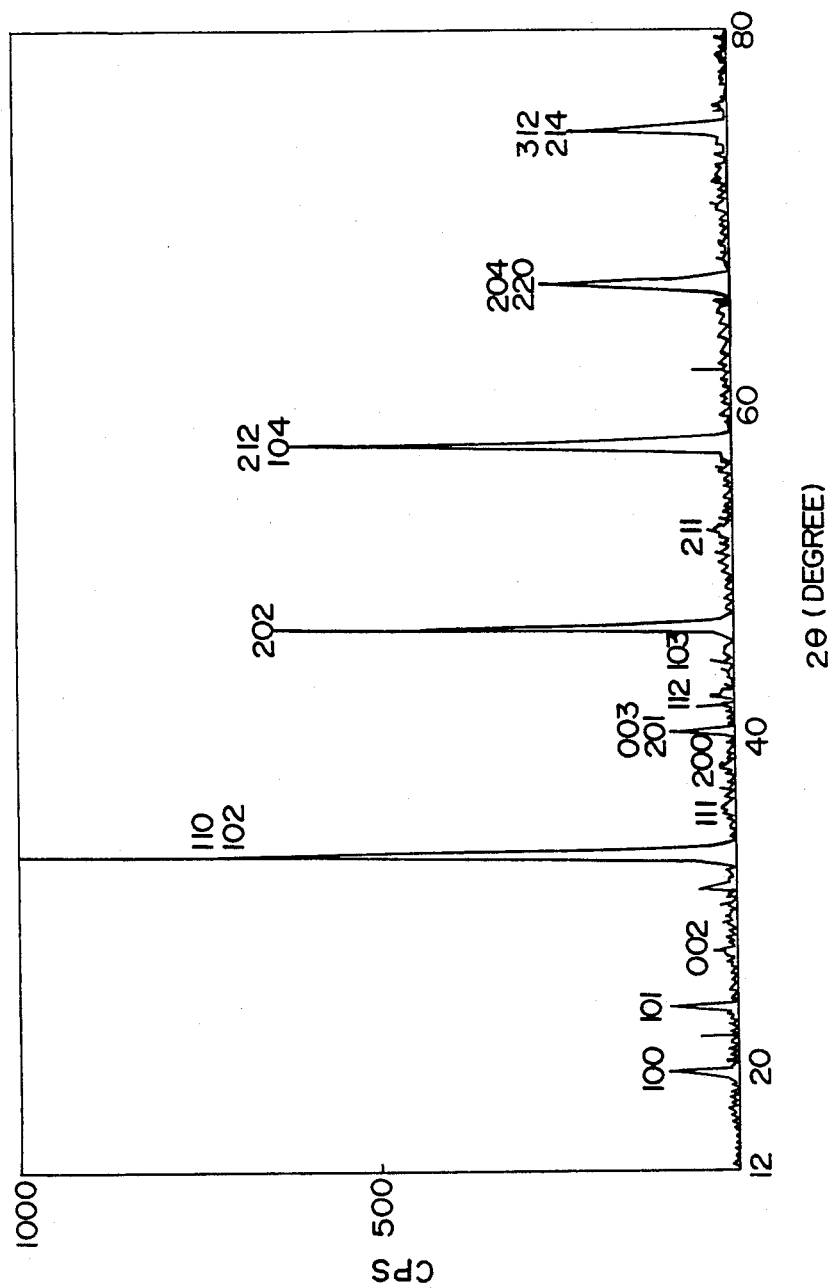
FIG. 2 is an X-ray diffraction chart of one embodiment of the dielectric ceramics of this invention.

FIG. 2 is an X-ray diffraction chart of a powder obtained by pulverizing the ceramics of sample No 17. The indexed diffraction lines in the chart are assigned to the hexagonal ordered plovskite-type structure, and diffraction lines of other crystal structures are scarcely observed.

TABLE 1

| Sample No. | x, y and z general formula (I) | | | $\epsilon_r$ | $Q_o$ (10 GHz) | $\tau_f$ (ppm/°C.) |
| --- | --- | --- | --- | --- | --- | --- |
| | x | y | z | | | |
| 1 | 0.05 | 0.05 | 0.05 | 25 | 18400 | 6 |
| 2 | 0.10 | 0.50 | 0.50 | 32 | 9000 | 12 |
| 3 | 0.25 | 0.25 | 0.25 | 29 | 11200 | 82 |
| 4 | 0.25 | 0.75 | 0.25 | 30 | 13500 | 63 |
| 5 | 0.25 | 0.25 | 0.75 | 31 | 14200 | 80 |
| 6 | 0.25 | 0.75 | 0.75 | 38 | 4900 | 89 |
| 7 | 0.50 | 0.50 | 0.50 | 33 | 5400 | 91 |
| 8 | 0.55 | 0.2 | 0.2 | 28 | 8900 | 9 |
| 9 | 0.58 | 0.8 | 0.4 | 31 | 6000 | 3 |
| 10 | 0.58 | 0.6 | 0.8 | 37 | 8100 | 7 |
| 11 | 0.58 | 0.2 | 0.4 | 29 | 7600 | 1 |
| 12 | 0.60 | 0.25 | 0.25 | 28 | 7700 | −5 |
| 13 | 0.60 | 0.50 | 0.50 | 33 | 7800 | −7 |
| 14 | 0.60 | 0.75 | 0.75 | 38 | 6700 | −5 |
| 15 | 0.60 | 0.75 | 0.25 | 31 | 6900 | −2 |
| 16 | 0.60 | 0.25 | 0.75 | 32 | 8800 | −3 |
| 17 | 0.60 | 0.60 | 0.60 | 35 | 7200 | −11 |
| 18 | 0.75 | 0.75 | 0.75 | 35 | 5900 | −14 |
| 19 | 0.75 | 0.25 | 0.25 | 28 | 4000 | −21 |
| 20 | 0.75 | 0.75 | 0.25 | 26 | 5500 | −26 |
| 21 | 0.75 | 0.25 | 0.75 | 33 | 9100 | −11 |

EXAMPLE 2

In each run, ceramics obtained by the same operation as in Example 1 except that the proportions of the raw materials were changed as shown by x, y and z values of general formula (I) in Table 2, and a disc-like molded article having a diameter of 20 mm and a thickness of about 10 mm was produced by the primary molding. The $\epsilon_r$, $Q_o$ and $\tau_f$ of the ceramics were measured by a dielectric rod resonator method at a frequency of 5 GHz. The results are shown in Table 2.

Samples Nos. 22 and 31 to which asterisks are attached are comparisons having x, y and z values outside the range specified in this invention. Samples Nos. 23 to 30 are examples of this invention. It is seen from Table 2 that the comparative samples having x, y and z outside the range of this invention have a lower specific dielectric constant or unloaded Q than the samples within the scope of the invention.

The comparative samples Nos. 22 and 31 have the composition represented by the formulae $Ba(Mg_{\frac{1}{3}}Ta_{\frac{2}{3}})O_3$ and $Sr(Zn_{\frac{1}{3}}Nb_{\frac{2}{3}})O_3$, respectively, and inherently have a temperature coefficients of resonant frequencies of +4 ppm degrees C. and −20 ppm/° C. respectively. These temperature coefficients cannot be freely changed to other desired values.

TABLE 2

| Sample No. | x in general formula (1) (provided x = y = z) | $\epsilon_r$ | $Q_o$ | $\tau_f$ (ppm/°C.) |
|---|---|---|---|---|
| *22 | 0 | 24 | 14800 | +4 |
| 23 | 0.25 | 30 | 13300 | +72 |
| 24 | 0.50 | 34 | 12100 | +86 |
| 25 | 0.55 | 34 | 12200 | +19 |
| 26 | 0.60 | 35 | 12100 | −4 |
| 27 | 0.70 | 35 | 11900 | −8 |
| 28 | 0.80 | 34 | 11600 | −16 |
| 29 | 0.85 | 34 | 10400 | −16 |
| 30 | 0.90 | 36 | 7900 | −17 |
| *31 | 1.00 | 40 | 4200 | −20 |

*Comparisons

As demonstrated by the results of the Examples, in the production of the dielectric ceramics of this invention, the temperature coefficient ($\tau_f$) of resonant frequencies can be freely changed to a desired positive or negative value in a region of high frequencies such as microwaves and millimeter waves, and therefore ceramics having the suitable temperature coefficient ($\tau_f$) of resonant frequencies can be selected. If the dielectric ceramics of this invention is used as a resonator in building an oscillator, the temperature coefficients, etc. of other component parts can be easily compensated, and it is easy to greatly increase the temperature stability of the oscillating frequency of the oscillator obtained.

Furthermore, since the dielectric ceramics of this invention has a high specific dielectric constant and a high unloaded Q, it can be favorably used in high frequency dielectrics.

What is claimed is:

1. A dielectric ceramic, consisting of a complex oxide having a perovskite-type crystal structure, said complex oxide having the composition represented by the following general formula:

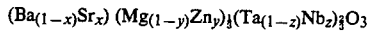

$$(Ba_{(1-x)}Sr_x)(Mg_{(1-y)}Zn_y)_{\frac{1}{3}}(Ta_{(1-z)}Nb_z)_{\frac{2}{3}}O_3$$

wherein x, y and z are numbers represented respectively by the expressions $0<x<1$, $0<y<1$ and $0<z<1$, and (Ba, Sr): (Mg, Zn): (Ta, [<], Nb) have an atomic ratio of substantially 3:1:2.

* * * * *